Figure 1:
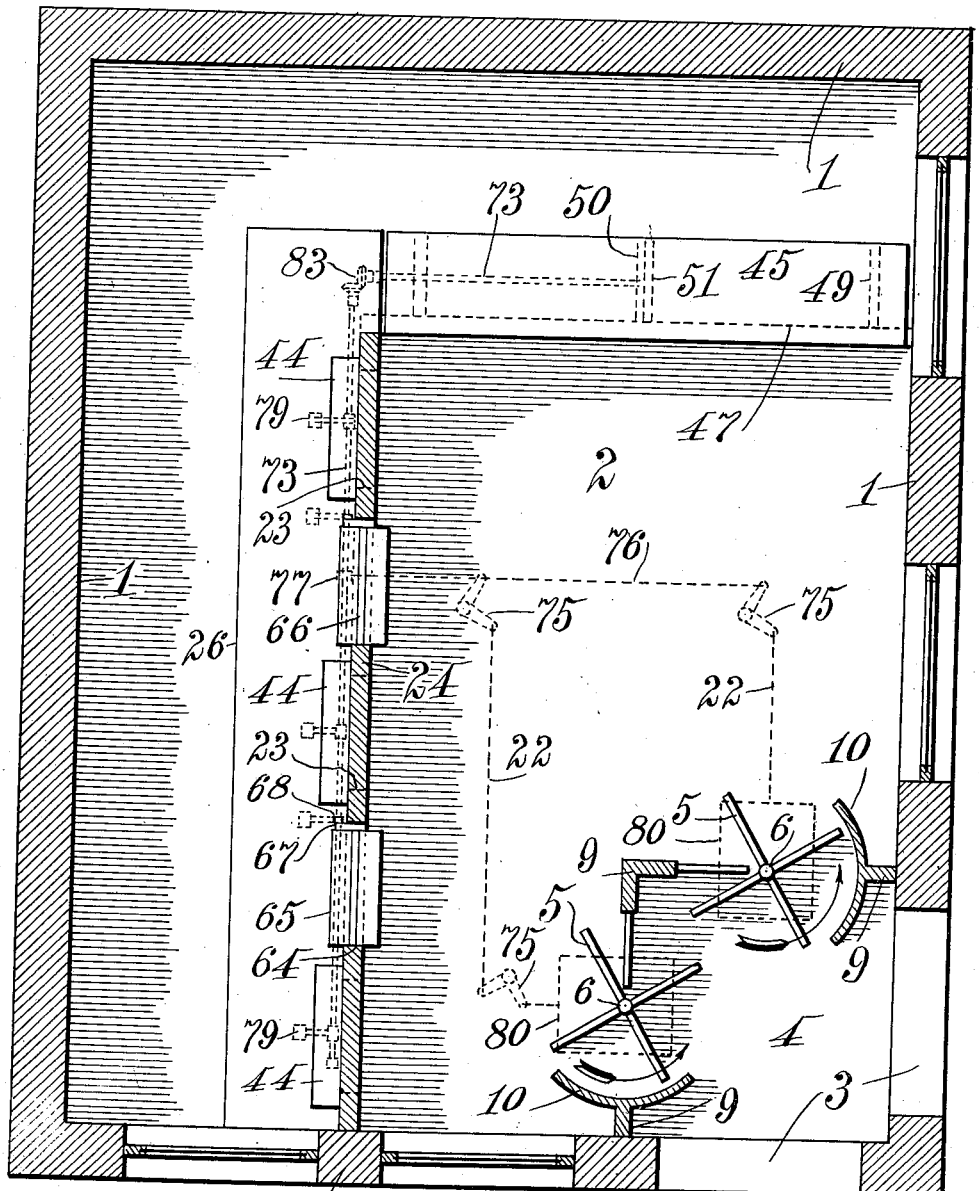

July 7, 1925.

S. H. GARST 1,544,571

PROTECTIVE MEANS FOR BANKS AND COUNTING HOUSES

Filed Sept. 30, 1920     5 Sheets-Sheet 1

Witness
M. Siebler

Inventor
S. H. GARST

By R. J. McCarty
his Attorney

July 7, 1925. 1,544,571
S. H. GARST
PROTECTIVE MEANS FOR BANKS AND COUNTING HOUSES
Filed Sept. 30, 1920 5 Sheets-Sheet 2
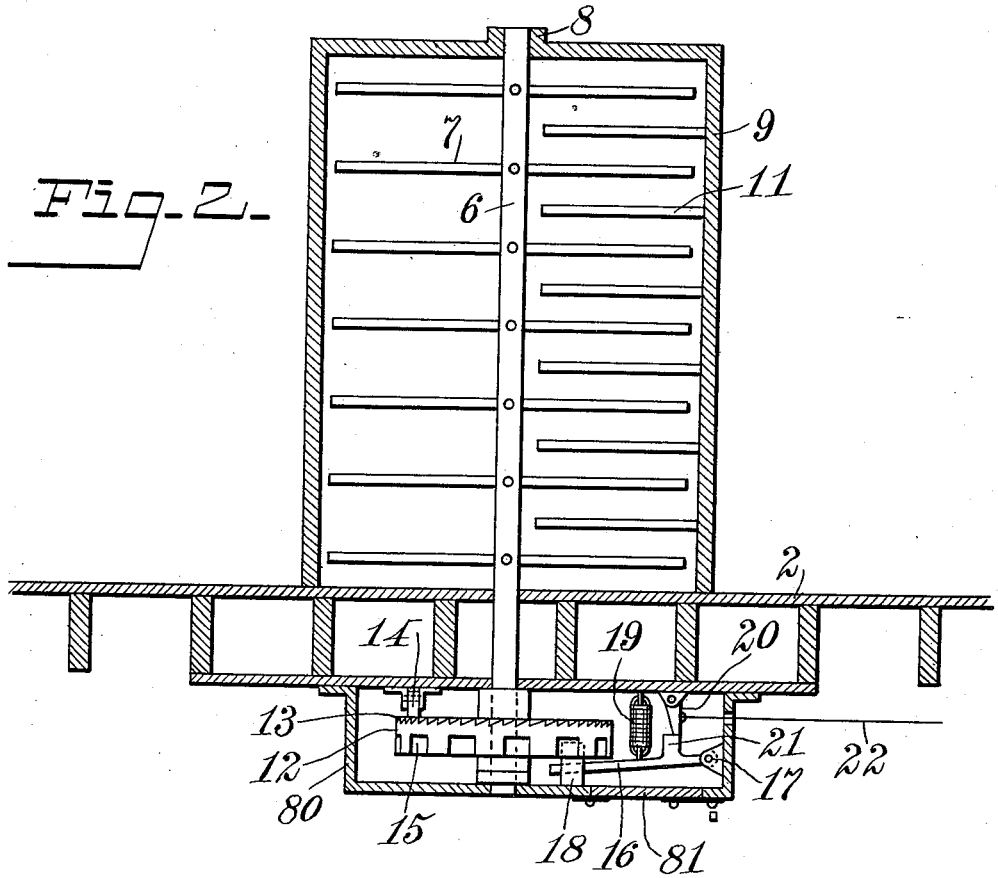
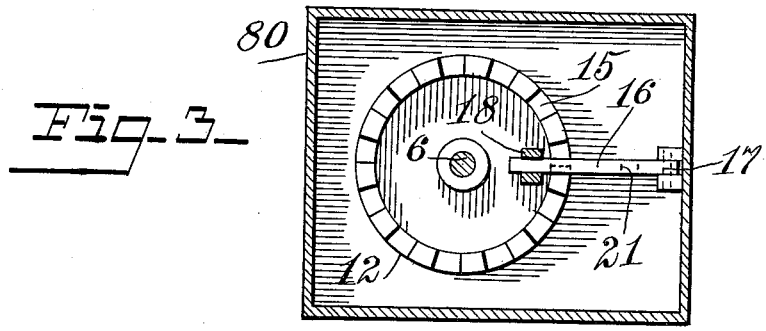
Inventor
S. H. GARST.

July 7, 1925. 1,544,571
S. H. GARST
PROTECTIVE MEANS FOR BANKS AND COUNTING HOUSES
Filed Sept. 30, 1920 5 Sheets-Sheet 3
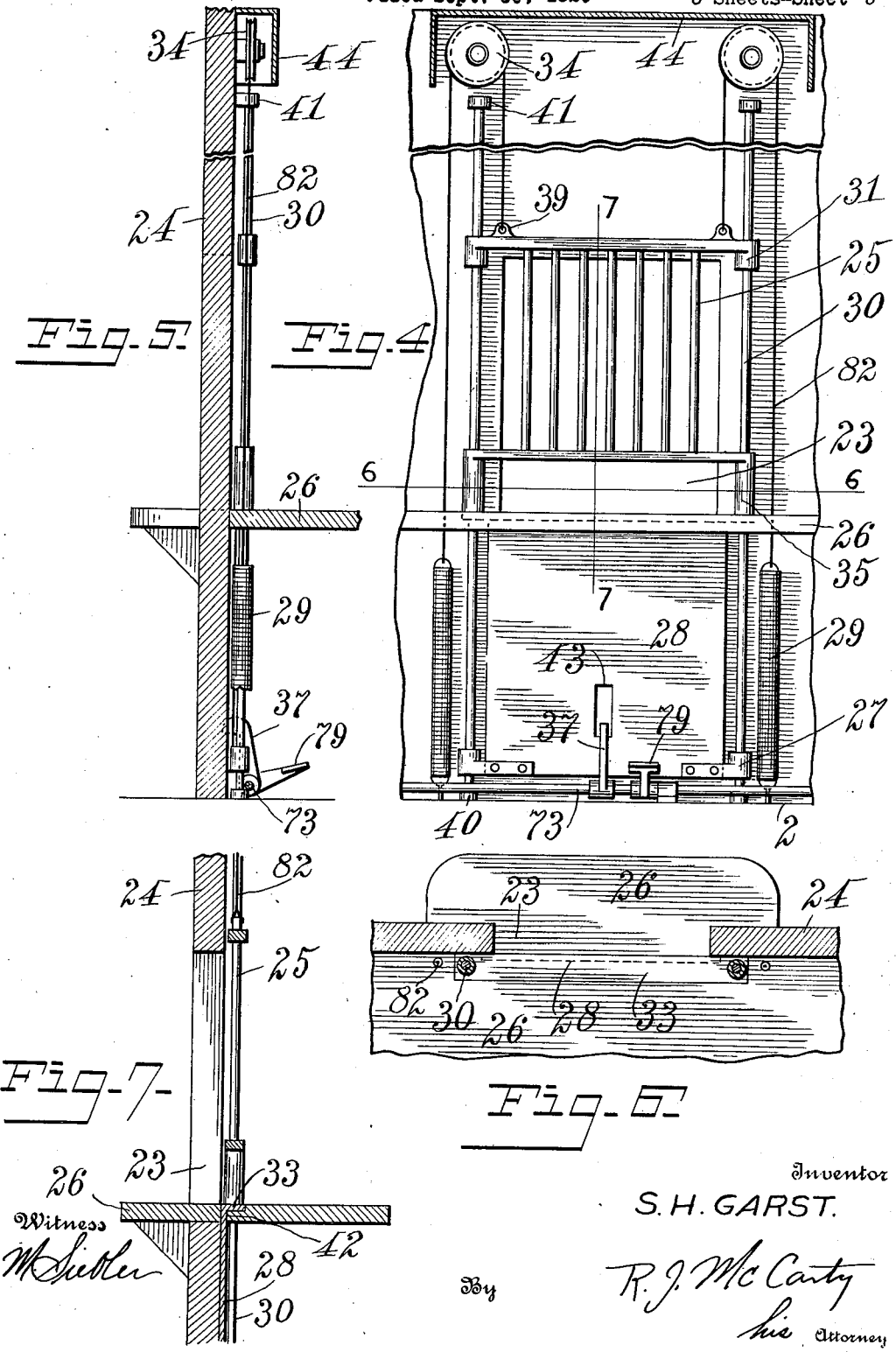
Inventor
S. H. GARST.
By R. J. McCarty
his Attorney

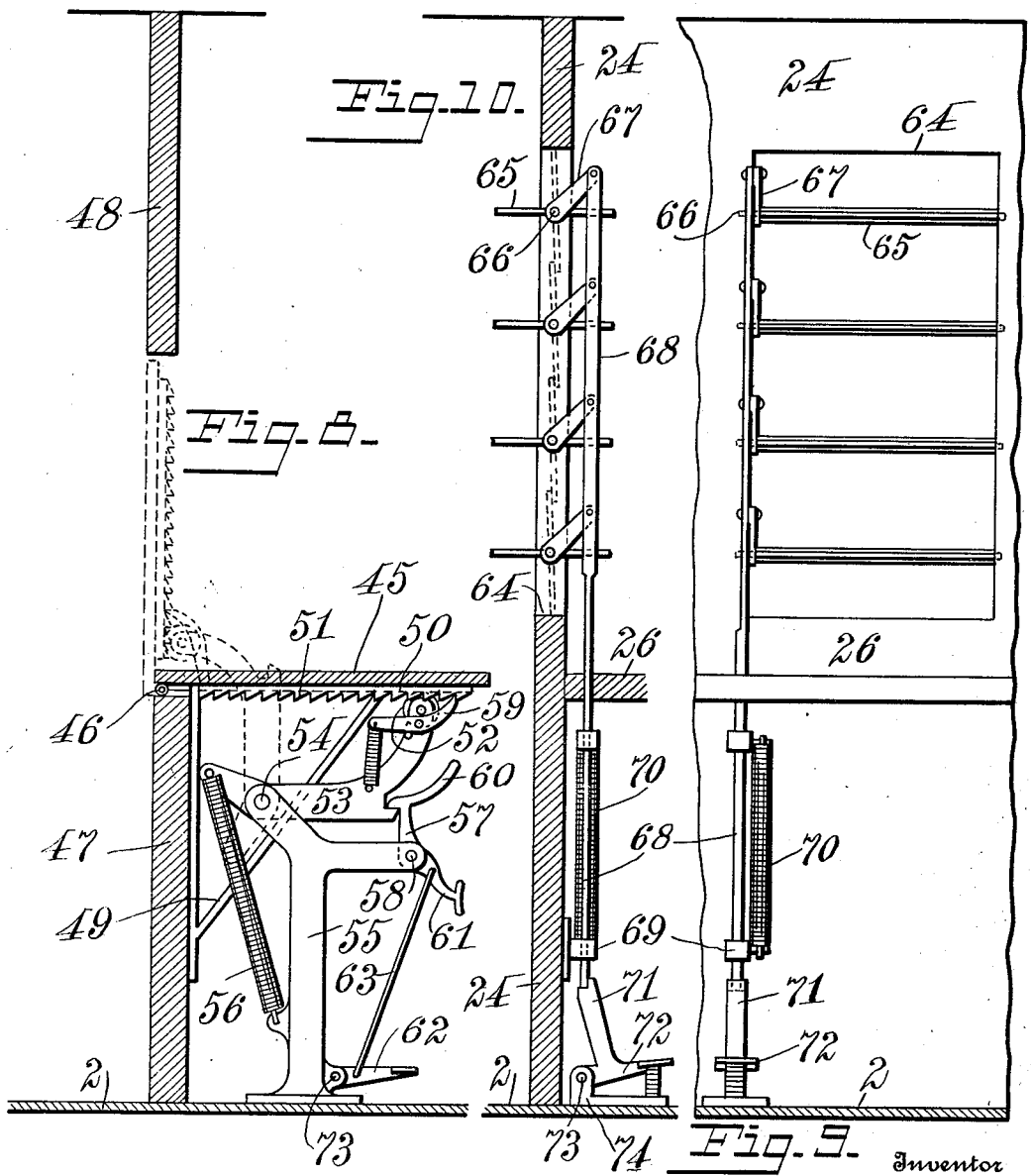

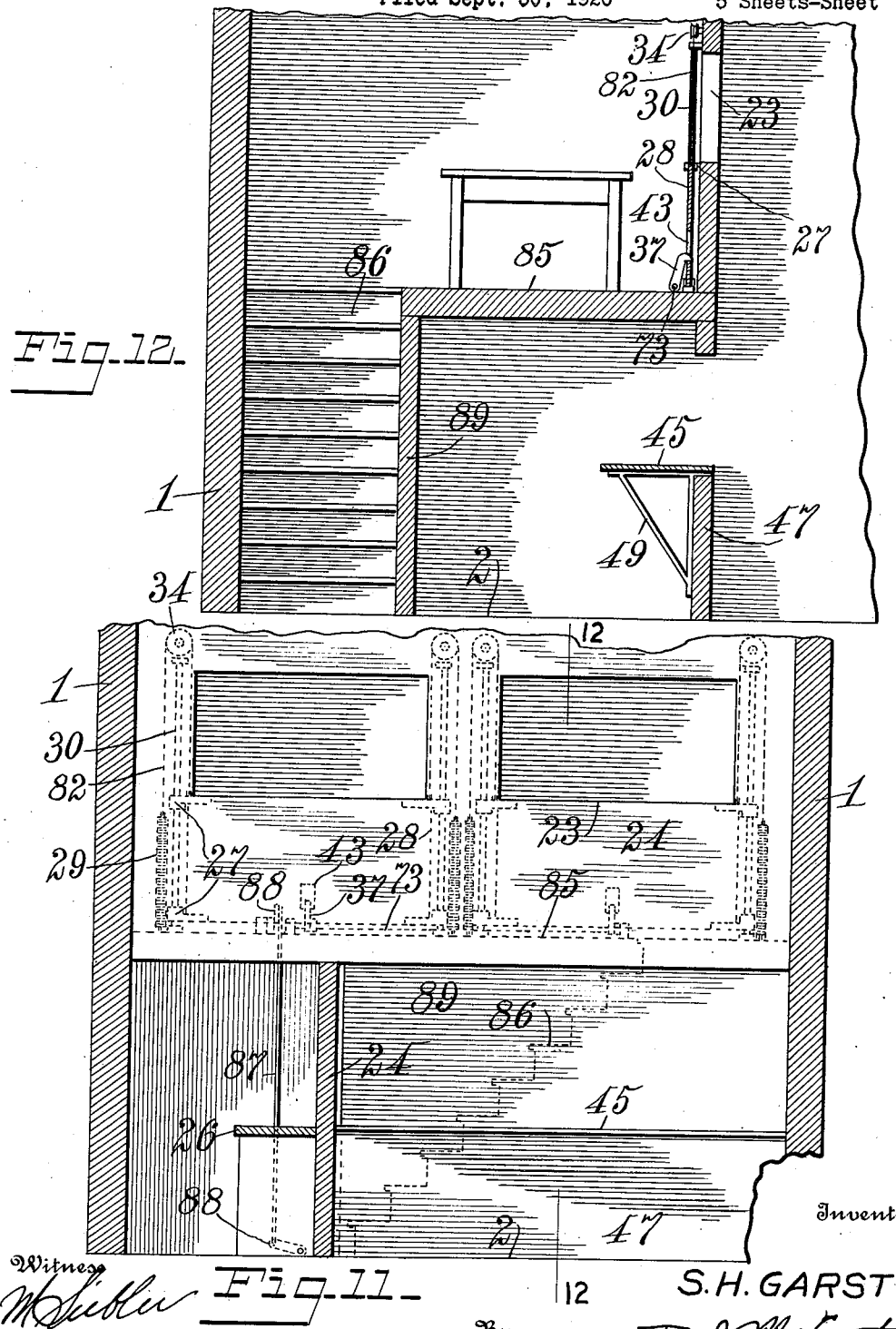

Patented July 7, 1925.

1,544,571

UNITED STATES PATENT OFFICE.

STEPHEN H. GARST, OF MOLINE, ILLINOIS.

PROTECTIVE MEANS FOR BANKS AND COUNTING HOUSES.

Application filed September 30, 1920. Serial No. 413,940.

*To all whom it may concern:*

Be it known that I, STEPHEN H. GARST, a citizen of the United States, residing at Moline, in the county of Rock Island and State of Illinois, have invented certain new and useful Improvements in Protective Means for Banks and Counting Houses, of which the following is a specification.

This invention relates to new and useful improvements in means for protecting banks and counting houses from burglars and hold-up men. The object of the invention is to provide means whereby, in the event of an attempt at robbing the bank or counting house the attack may be frustrated, the culprit captured and the employees of the bank protected from injury. To the above end the devise is simple in construction and efficient in operation.

Referring to the accompanying drawings Fig. 1 is a plan view of the floor of a bank equipped with my improvements; Fig. 2 is an elevation of the entering and exit turnstiles; Fig. 3 is a bottom plan view of the locking means for the turnstiles; Fig. 4 is an elevation of the means for protecting the employees at the windows at which business is transacted; Fig. 5 is a side elevation of the same; Fig. 6 is a section on the line 6—6 of Fig. 4; Fig. 7 is a section on the line 7—7 of Fig. 4; Fig. 8 is an end sectional view of the means for protecting the employees at the open counter; Fig. 9 is an elevation of the means for closing the ventilation spaces between the various windows at which business is transacted; Fig. 10 is a side elevation of the same; Fig. 11 is an elevation of an end of a banking room showing a modified construction which incorporates a mezzanine floor; and Fig. 12 is a section on the line 12—12 of Fig. 11.

Throughout the specification and drawings similar reference characters indicate corresponding parts.

Referring more particularly to the drawings and to Fig. 1, —1— represents the walls of a bank building having a floor —2— and doors —3—. The building —1— is provided with a vestibule —4— having turnstiles —5—. There may be any number of these turnstiles depending upon the size of the bank. In the present instance I have shown two, one for the entrance and the other for the exit. The turnstiles —5— are shown in detail in Figs. 2 and 3. The turnstiles are provided with a shaft —6— from which radiate arms —7—. The upper end of the shaft —6— is journaled at —8— in the vestibule housing —9— and at its lower end in the floor —2—. The arms —7— are disposed along the entire length of the shaft —6— above the floor. The vestibule housing —9— is provided with semi-circular portions —10— which lie on the traveling sides of the turnstiles. The opposite sides of the turnstiles are provided with arms —11— which extend from the housing —9— and project between the arms —7—. The portions —10— and —11— prevent persons slipping around the ends of the arms —7— and compel the rotation of the turnstiles when any one enters or leaves the bank. To compel each turnstile to rotate in its proper direction, one end of the shaft —6—, the lower end in the present instance, is provided with a wheel —12— having ratchet teeth —13— in operative relation with a pawl —14— mounted on the under side of the floor. To lock the turnstile against rotation in case of emergency, thereby preventing anyone entering or leaving the bank, the wheel —12— is provided with notches —15— on its lower side. The notches —15— are adapted to receive a locking lever —16— pivoted at —17—. The lever —16— for each turnstile is provided with guiding members —18— and is adapted to be moved into the recesses —15— by a spring —19—. The lever —16— is normally held out of the recesses —15— by a latch —20— normally in engagement with a projection —21— on the lever. The latch —20— is tripped to release the lever —16— by a rod or cable —22—. When the latch is released the spring —19— pulls the lever into one of the notches —15— thereby preventing the turnstile rotating. The rod or cable —22— is operated by means hereinafter described. The mechanism for locking the turnstiles may be mounted on either end of the shaft —6— and is inclosed within a suitable housing —80— provided with a door —81— which gives access to the mechanism.

In Figs. 4 to 7 inclusive means are shown for closing the individual openings at which business is transacted, such as the cashier's and receiver's windows. Openings marked in the drawings are located in a wall 23 —24— within the bank. The openings —23— are provided with the usual grating —25— and are located adjacent to a counter —26— which runs along the inner side of the wall —24—. Mounted on the inner side of the wall —24— and on each side of each opening —23— are guides —30— supported at —40— to the floor —2— and at —41— to the wall —24—. Adapted to slide on the guides —30— is a grating —25— and a shutter —28—. The grating —25— normally screens the opening —23—. The grating —25— is provided with bearings —31—, the shutter —28— with bearings —27— while both are provided with bearing sleeves —35— which are instrumental in connecting the grating and shutter whereby they move in unison. The grating and shutter are elevated, to a position for the shutter to cover the opening —23—, by springs —29— which are connected to the grating at —39— by cables —82— which pass over pulleys —34— in a housing —44—. The grating and shutter are held in a depressed position, against the tension of the springs —29—, by a latch —37— which engages the edge of an opening —43— in the shutter. The latch —37— may be tripped to release the shutter by a treadle —79— mounted on a shaft —73— upon which the latch is also mounted. The opening —43— permits firearms to be projected through the shutter when the shutter covers the opening —23— during an emergency. The shutter —28— slides through a slot —42— in the counter —26—, and when in a normal position the upper edge of the shutter lies flush with the surface of the counter. To present a smooth surface, at this point, the shutter is provided with a flange —33—.

In Figs. 1 and 8 there is shown an open counter —45—. To protect the employees of the bank working at this counter, the said counter is hinged at —46— to a lower wall —47—. The counter —45— may be thrown to a position shown by dotted lines in Fig. 8. When in this position the space behind the open counter is entirely closed by the counter —45—, the lower wall —47— and an upper wall —48— which extends from the upper edge of the counter —45— to the ceiling of the banking room. The counter —45— is elevated by the following means. Counter —45— is normally held in a horizontal position by brackets —49—. On its under side the counter is provided with a track —50— and a ratchet teeth —51—. In operative relation with the track —50— is a roller —52— mounted on the end of a lever —53— pivoted at —54— to a standard —55—. The end of the lever —53— opposite the roller —52— is attached to a spring —56— also secured to the standard —55—. The lever —53— is held in a depressed position by a latch —57— pivoted at —58— to the standard. When the latch —57— is released the spring —56— throws the counter —45— to the position shown by dotted lines. The counter is locked in this position by a spring controlled pawl —59— mounted on the lever —53— and in operative relation with the ratchet teeth —51—. The latch —57— may be manually actuated by means of an arm —60—, by means of the knee through the agency of a projection —61— or by the foot through the agency of a lever —62— and a connecting rod —63—.

To provide ventilation in the space behind the wall —24— the said wall is provided with openings —64—. To close these openings in case of emergency the means shown in detail in Figs. 9 and 10 are provided. —65— are shutters mounted on shafts —66— journaled in the wall —24— at the sides of the openings —64—. The shutters —65— normally lie horizontally and the shafts —66— are provided with cranks —67— connected by a rod —68—. The rod —68— extends downwardly toward the floor. Its lower end is guided by a bearing —69—. Attached to the bearing —69— and to the rod —68— is a spring —70— which, when the shutters are in a horizontal position, is under tension. The spring —70— is held under tension by a latch —71— in engagement with the lower end of rod —69—. The latch —71— extends from a foot lever —72—. When the foot lever —72— is depressed the spring —70— is released which moves the shutters —65— to a closed position.

The locking of the turnstiles against rotation, the closing of the window openings —23—, the elevation of the counter —45— and the closing of the ventilating openings —64— is accomplished simultaneously and in the case of emergency through the agency of a shaft —73—. The shaft —73— is provided with suitable bearings —74—, connecting devices —83—, and is mounted adjacent to the floor and under the counters —26— and —45— in a position easily accessible to the employees. The shaft —73— is rocked by any employee in case of emergency. When so rocked the rods or cables —22— of the turnstiles are actuated to lock the turnstiles through the agency of bellcrank levers —75— and a cable —76— connected to a crank —77— on the shaft —73—. At the same time the grating —25— and shield —28— of the window openings —23— are actuated as the latch —37— is mounted on the shaft —73—. At the same time the open counter —45— is elevated as its foot lever —62— is mounted on the shaft —73—. Also at the same time the shutters —65— of the ventilating openings —64— are closed as their foot levers —72— are mounted on the shaft —73—. In addition to foot levers —62— and —72— the shaft —73— may be provided with any number of foot levers —79—.

In Figs. 11 and 12 there is shown the end of a banking room provided with a mezzanine floor —85— to which access may be had by stairs —86— inclosed by a wall —89—. The floor —85— is provided with a wall —24— having openings —23— similar to the wall —24— before described. The openings —23— at the mezzanine floor, are adapted to be closed by shields —28— which slide on rods —30— and which are actuated by springs —29— released by latches —37—. The construction and operation of the shields —28—, on the mezzanine floor, is identical with that illustrated in Figs. 4 and 5 with the exception, that, no grating —25— is provided. The latches —37— of all of the shields —28—, may be simultaneously actuated by a rod —87— and cranks —88— mounted on the shafts —73—. By providing a mezzanine floor, a point of advantage is given the employee of the bank in case of an emergency.

Having described my invention, I claim:

1. In a banking room or the like having a partition dividing the same into inner and outer compartments and having a passageway leading from the outer compartment to the exterior of said room, a turnstile to control said passageway, a locking member rigidly secured to and rotating with said turnstile and having a depending flange provided with a series of notches in its lower edge, a finger pivotally mounted on a fixed support for movement into and out of said notches, a spring tending to move said finger toward said locking member, a latch normally engaged in said finger to hold the same out of engagement with said locking member, and means operable from said inner compartment to actuate said latch to release said finger.

2. In a banking room or the like having a partition dividing the same into inner and outer compartments, said partition having an opening, a counter hinged to the lower portion of said partition adjacent to said opening, means adapted to elevate said counter to a vertical position in line with said opening, and means for automatically locking said counter in either a fully elevated or partially elevated position.

3. In a banking room or the like having a partition dividing the same into inner and outer compartments and having an opening therein, a counter hinged to said partition near the lower edge of said opening, a toothed rack secured to the lower side of said counter, a lever pivotally mounted beneath said counter and connected therewith to elevate the same to a vertical position in line with said opening, a spring connected with said lever, and a pawl carried by said lever and cooperating with said toothed rack to lock said counter in an elevated position.

4. In a banking room or the like having a partition dividing the same into inner and outer compartments and provided with an opening, a counter hinged to said partition near the lower edge of said opening, a spring actuated device to elevate said counter to a vertical position in line with said opening, a latch to hold said counter in a depressed position, a shaft extending along said partition on the inner side thereof and operatively connected with said latch, and means for automatically locking said counter either in a partial or fully elevated position.

5. In a banking room or the like having a partition dividing the same into inner and outer compartments, said partition having an opening therein, and said outer compartment having a passageway leading therefrom to the exterior of said room, a turnstile mounted in said passageway, a normally inoperative device for locking said turnstile against movement, a shutter movably mounted adjacent to the opening in said partition, actuating means for moving said shutter into line with said opening, a controlling device on the inner side of said partition, and means for operatively connecting said controlling device with the locking device for said turnstile and with the actuating means for said shutter.

6. In a banking room or the like having a partition dividing the same into inner and outer compartments, said partition having an opening therein, and said outer compartment having a passageway leading therefrom to the exterior of said room, a turnstile mounted in said passageway, a normally inoperative device for locking said turnstile against movement, a shutter movably mounted adjacent to the opening in said partition, actuating means for moving said shutter into line with said opening, a shaft extending along said partition on the inner side thereof, means for operatively connecting said shaft with the locking device for said turnstile and with the actuating means for said shutter, and a plurality of devices for actuating said shaft to cause said turnstile to be locked and said shutter to be actuated simultaneously.

7. In a banking room or the like having a partition dividing the same into inner and outer compartments, and having an opening therein, and having a passageway leading from said outer compartment to the exterior of said room, a turnstile to control said passageway, means for locking said turnstile against rotation, a shutter mounted adjacent to one of said openings for movement into line therewith, spring actuated means to actuate said shutter, a detent to retain said shutter normally out of line with said opening, a counter hinged to said partition near the lower edge of another of said openings, a spring actuated device to move said counter into a vertical position in line with its opening, a latch to control the operation of said spring actuated device, a shaft extending along the inner side of said partition above the floor and operatively connected with said locking means and said latches, and a plurality of actuating devices for said shaft, the manipulation of any one of which will cause the operation of said locking device, and of the spring actuated devices for said shutter and said counter.

8. In a banking room or the like having a partition dividing the same into inner and outer compartments and having an elevated compartment, said elevated compartment having a front wall provided with an opening overlooking the outer compartment of said room, means operable from the inner compartment for controlling the communication between the inner and outer compartments and the exit from said outer compartment, a shutter for the opening in the wall of said elevated compartment, and means for moving said shutter into line with said opening, said shutter having an opening therein which will lie in line with the opening in said wall when the shutter is in its closed position.

9. In a banking room or the like having a partition dividing the same into inner and outer compartments and provided with an opening and having a passageway leading from the outer compartment to the exterior of said room, said room also having an elevated compartment communicating with said inner compartment and having a front wall provided with an opening overlooking said outer compartment, a turnstile to control said passageway, a spring actuated locking device for said turnstile, shutters for the openings in said partition and in the wall of said elevated compartment, springs acting on said shutters to move them into line with the respective openings, detents to retain said shutters normally in their open positions, a single-controlling device for releasing the detents of said shutters and for releasing said locking device, and a plurality of devices for actuating said controlling means, the shutter for the opening in the wall of said elevated compartment having a relatively small opening therein.

10. In a banking room or the like having a partition dividing the same into inner and outer compartments and having a passageway leading from said outer compartment to the exterior of said room, a normally operative turn stile to control said passageway, a locking member connected with said turn stile for rotation therewith and having a series of recesses spaced about the same, a second locking member mounted on a fixed support for movement into and out of said recesses, and means operable from the inner compartment to control the movement of said second locking member.

11. In a banking room or the like having a partition dividing the same into inner and outer compartments and having a passageway leading from said outer compartment to the exterior of said room, a normally operative turn stile to control said passageway, a locking member connected with said turn stile for rotation therewith and having a series of recesses spaced about the same, a second locking member mounted on a fixed support for movement into and out of said recesses, a spring acting on said second locking member to move the same toward the first mentioned locking member, a detent to hold said second locking member in an inoperative position, and means operable at a point remote from said turn stile to operate said detent and release said second locking member.

12. In a banking room or the like having a partition dividing the same into inner and outer compartments, said partition having an opening therein, guide rods mounted within said inner compartment on opposite sides of said opening, a grating slidably mounted on said guide rods and arranged normally in line with said opening, a shutter also slidably mounted on said guide rods and arranged normally out of line with said opening, a spring actuated device connected with said grating and said shutter to simultaneously move said grating out of line with said opening and to move said shutter into line with said opening, and means to retain said grating and said shutter normally in their first mentioned positions, and means operable from within said inner compartment to release said shutter and said grating for movement by said spring actuated device.

13. In a banking room or the like having a partition dividing the same into inner and outer compartments, said partition having an opening therein, guide rods mounted within said inner compartment on opposite sides of said opening, a grating slidably mounted on said guide rods and arranged normally in line with said opening, a shutter also slidably mounted on said guide rods and arranged normally out of line with said opening, a spring actuated device connected with said grating and said shutter to simultaneously move said grating out of line with said opening and to move said shutter into line with said opening, said shutter having a slot therein adapted to register with said opening when the shutter is in line with the opening, a detent adapted to engage the edge of said opening to retain said shutter in its normal position, and foot operated means arranged within said inner compartment to actuate said detent.

In testimony whereof I affix my signature.

STEPHEN H. GARST.